Patented Feb. 7, 1928.

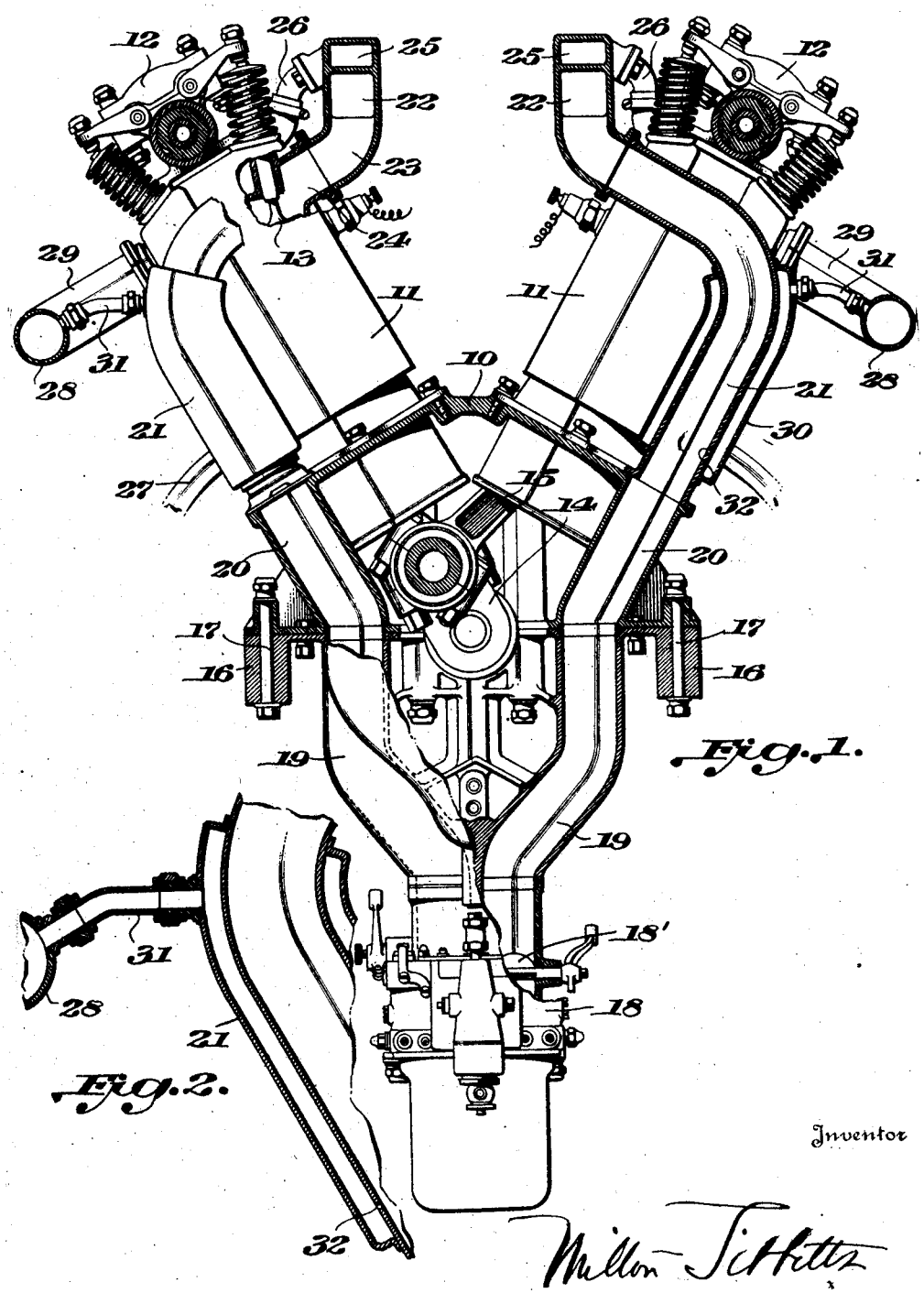

1,658,308

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed October 27, 1920. Serial No. 419,988.

This invention relates to hydrocarbon motors and particularly to means for heating the mixture passing from the carburetor to the motor cylinders.

One of the objects of the present invention is to provide means for utilizing some of the exhaust heat of the motor for heating the incoming mixture.

Another object of the invention is to provide novel means for feeding some of the hot exhaust gases into the intake conduit to thereby mix with and heat the incoming mixture.

Another object of the invention is to provide an exhaust heated jacket for the intake conduit together with means for controlling the feed of exhaust gas to said jacket.

Other objects of the invention will appear from the following description taken together with the drawings which form a part of this specification, and in which:

Figure 1 is a vertical transverse section through a hydrocarbon motor embodying this invention;

Figure 2 is an enlarged sectional view of parts of the intake and exhaust conduits of the motor shown in Figure 1.

Figure 3:
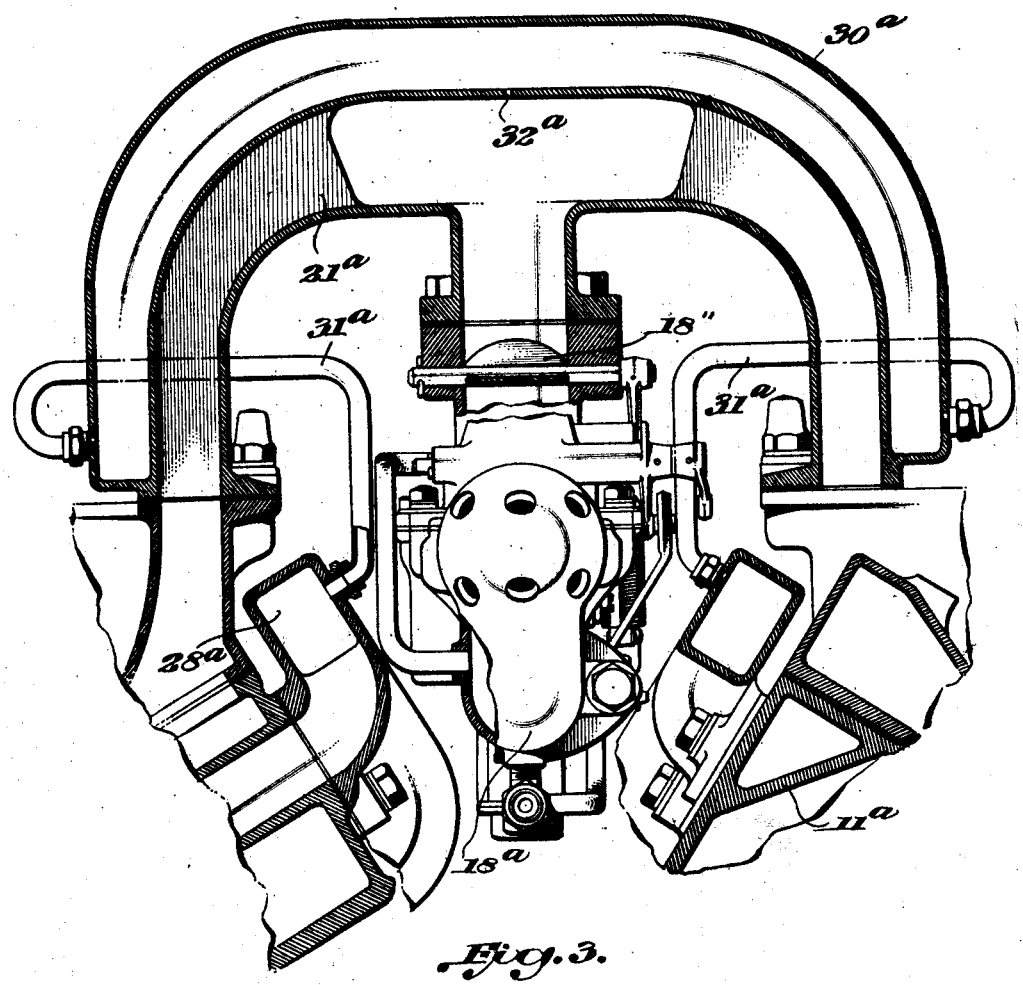
Figure 3 is a view similar to Figure 1, illustrating another form of the invention.

Referring to the form of the invention shown in Figures 1 and 2, 10 represents the crankcase of a hydrocarbon motor upon which are mounted several cylinders 11. These cylinders are shown arranged in parallel series in V form and they are provided with overhead valve mechanism 12 of the usual or any desirable construction. One of the intake valves 13 is shown in the cut-away part of the cylinder in Figure 1.

It will be understood that the cylinders 11 may be separately formed and secured to the crankcase or may be in the form of cylinder blocks each of which comprises several motor cylinders.

In the crankcase 10 is a crankshaft 14 and the usual connecting rods 15 are shown.

The motor illustrated in Figure 1 is designed for airplane use and it is adapted to be supported upon a suitable frame comprising bars 16, the securing means being bolts 17 or similar devices. A carburetor 18 shown as of duplex form, is mounted beneath the crankcase so its intake will be outside of the fuselage, and the crankcase itself is formed with passages or conduits 19 in its lower part and continuations 20 thereof in its upper part, for carrying the mixture from the carburetor 18 upwardly to the motor. In these conduits or in the carburetor 18 at any desirable point is a throttle valve 18', one for each of the parallel passages but mounted on a single shaft to be operated together.

The intake conduits continue from the passage 20 upwardly through pipes or conduits 21 to conduits or pipes 22 which extend longitudinally of the motor and which have branches 23 connecting with the intake passages 24 of each of the cylinders. The longitudinally extending conduits 22 may be water-jacketed as shown at 25, water being fed to these jackets 25 by pipes 26 from the upper parts of the water jackets of the cylinders. Pipe 27 feeds the water to the cylinder jackets from any suitable pump.

The motor is provided with an exhaust pipe 28 for each of the series or sets of cylinders and as shown these pipes are on the outer sides of the motor and they are connected with the cylinder exhaust ports by branch pipes 29. The exhaust pipes 28 may lead to a muffler or any other means for carrying the exhaust gas to the atmosphere.

It will be seen that the exhaust pipes 28 pass rather close to but not in contact with the intake conduits 21 and for the purpose of heating the mixture as it passes through said conduits 21 the latter are provided with heating jackets 30, and pipes 31 connect the exhaust pipes 28 with these heating jackets. This connection is shown at the upper ends of the jackets 30 and near the lower ends of the jackets each of them is provided with a passage or opening 32 which is appreciably smaller than the cross-sectional area of the passage 31. This is particularly well illustrated in Figure 2 of the drawings where the passage through the pipe 31 is shown to be two or three times the diameter of the opening or port 32.

From the above it will be seen that some of the exhaust from the exhaust pipe 28 will pass through the pipe 31 into the jacket 30 where it will heat the pipe 21 and thereby heat the mixture passing through that pipe or conduit. This exhaust gas will also pass through port 32 into the intake conduit 21 and there mix with the mixture passing to the motor and further heat said mixture. It will be seen further that since the opening 32 is above the throttle valve 18' or between the latter and the motor cylinders, the suction to which the exhaust gas in the jacket 30 is subjected will be greater when the throttle valve is closed than when it is open. Therefore there will be a greater tendency to draw in exhaust gas when the motor is idling and running at slow speeds than when it is wide open, as in the latter case the suction of the intake pipes will be supplied by the wide open carburetor and less of the exhaust gas will be drawn in with the mixture. Thus the mixture will be supplied with heat from the exhaust when it most needs that heat, as when idling or running at slow speeds, and very little heat will be supplied by the exhaust when the mixture does not need that heat as when running with nearly or completely wide open throttle.

It is important that the opening 32 should be smaller than the opening through the pipe 31 because the size of the opening 32 controls the amount of the exhaust gas drawn into the intake conduit and it is desirable to limit this amount while at the same time permitting the exhaust gas to bank up in the jacket 30. In this way a considerable amount of the heat from the exhaust passes to the mixture through the walls of the intake conduits 21.

Referring to the form of the invention shown in Figure 3, the cylinder blocks are illustrated at 11$^a$, the carburetor at 18$^a$, the throttle valve at 18'', the intake conduit at 21$^a$ and the exhaust conduit at 28$^a$, there being an exhaust conduit for each of the cylinder blocks.

The intake conduit 21$^a$ is jacketed as shown at 30$^a$ and pipes 31$^a$ lead from the exhaust pipes 28$^a$ to the jacket 30$^a$. A port or opening 32$^a$ leads from the middle part of the jacket 30$^a$ to the intake conduit 21$^a$, this port 32$^a$ being between the throttle valve and the motor cylinders.

Thus the action is the same in the form of the invention shown in Figure 3 as in the other form, in that the suction on the heating jacket is in inverse ratio to the opening of the motor throttle, or in other words, the suction decreases as the motor throttle opens.

It will be seen that in both of the forms of the invention shown the exhaust pipes are separate from the intake pipes so that there is no direct transference of heat from one pipe to the other, the only means of transferring heat being through the pipes 31 or 31$^a$. Thus when the motor is running with full open throttle and working hard the very great heat passing into the exhaust will not tend to unduly heat the mixture and thereby cut down the power of the motor as is the case where the intake and exhaust pipes are cast integral or are otherwise intimately associated for the purpose of getting considerable transference of heat at low speeds. In those cases too great an amount of heat is transferred at high speeds with the result above stated that the mixture is so highly heated that only a relatively small volume can be drawn into the cylinders.

It will be understood that various forms of the invention other than those described above may be used without departing from the spirit or scope of the invention.

Having thus described my invention, what I claim and desire to secure by Letters Patent is:

1. The combination with a hydrocarbon motor having parallel cylinder blocks, an intake conduit extending across from one block to the other, a carburetor connected to said intake conduit, a throttle valve for the mixture passing through said intake conduit, a jacket for said intake conduit, said jacket having an outlet opening into said intake conduit between said throttle valve and the motor cylinders, and a connection from the motor exhaust to said jacket.

2. In a V-type hydrocarbon motor, the combination with the cylinder blocks, of an intake conduit extending from one block to the other, a carburetor connected to the intake conduit, a throttle valve for controlling the mixture, a heating jacket on the intake conduit, said jacket having an outlet opening into the middle part of the conduit beyond the throttle valve, and a connection from each of the cylinder block exhausts to the respective outer ends of said jacket.

In testimony whereof I affix my signature.

MILTON TIBBETTS.